(12) United States Patent
Netland et al.

(10) Patent No.: US 7,678,292 B2
(45) Date of Patent: Mar. 16, 2010

(54) LIQUID CRYSTAL DOPANTS

(75) Inventors: Kjetil A. Netland, Flekkefjord (NO); Maxim V. Mitrokhine, Saratov (RU); Lorenzo Williams, Oslo (NO); Kjetil H. Holm, Oslo (NO); Fiona J. Farrand, Oslo (NO)

(73) Assignee: Polydisplay ASA, Sandefjord (NO)

( * ) Notice: Subject to any disclaimer, the term of this patent is extended or adjusted under 35 U.S.C. 154(b) by 1159 days.

(21) Appl. No.: 10/526,659

(22) PCT Filed: Sep. 2, 2003

(86) PCT No.: PCT/GB03/03807

§ 371 (c)(1),
(2), (4) Date: Sep. 13, 2005

(87) PCT Pub. No.: WO2004/022670

PCT Pub. Date: Mar. 18, 2004

(65) Prior Publication Data

US 2006/0091358 A1      May 4, 2006

(30) Foreign Application Priority Data

Sep. 9, 2002     (GB) .................................. 0220874.2

(51) Int. Cl.
C09K 19/00 (2006.01)
C09K 19/06 (2006.01)
C09K 19/52 (2006.01)
C09K 19/58 (2006.01)

(52) U.S. Cl. ............................. 252/299.2; 252/299.01; 252/299.6; 428/1.1; 430/20

(58) Field of Classification Search ............ 252/299.01, 252/299.2, 299.6; 428/1.1; 430/20
See application file for complete search history.

(56) References Cited

U.S. PATENT DOCUMENTS

| 3,888,566 A | | 6/1975 | Toriyama et al |
| 3,922,067 A | | 11/1975 | Murao et al |
| 3,950,264 A | | 4/1976 | Jones, Jr. |
| 3,963,638 A | * | 6/1976 | Bucher et al. ............ 252/299.2 |
| 3,966,631 A | | 6/1976 | Toriyama et al. |
| 4,091,847 A | | 5/1978 | Sorkin |

FOREIGN PATENT DOCUMENTS

| DE | 19953830 A1 | 5/2001 |
| GB | 1434275 | 8/1973 |
| GB | 1 523 808 | 9/1978 |
| GB | 2 161 637 | 1/1986 |
| JP | 51047587 | 4/1976 |
| WO | 86 04324 | 7/1986 |

OTHER PUBLICATIONS

Hammond et al, *Liquid Crystals*, 29(9):1151-1159 (2002).
Anonymous, "Liquid Crystal Compositions, Methods and Devices", XP002264647, *Research Disclosure*, 12512:14-16, (1974).
Myrvold and Coles, "DC Conductivity in Smectic A Phases-A Breakdown of Kohlrausch's Law," *Mol. Cryst. Liq. Cryst.*, vol. 259, pp. 75-92, (1995).

* cited by examiner

*Primary Examiner*—Geraldina Visconti
(74) *Attorney, Agent, or Firm*—Sughrue Mion, PLLC (57) ABSTRACT

An ionic dopant comprising a sulfur or a phosphorus containing anion with a randon cation, for use in a smectic A liquid crystal composition. The cation preferably comprises a quaternary ammonium cation.

19 Claims, 1 Drawing Sheet

Figure 1

LIQUID CRYSTAL DOPANTS

This application is a 371 of PCT/GB2003/003807, filed Sep. 2, 2003; the disclosure of which is incorporated hereby by reference.

The present invention relates to dopants for use in liquid crystal (LC) compounds and their mixtures and in particular to ionic dopants for use in smectic A liquid crystal compounds.

Liquid crystal compositions which exhibit a smectic A phase may be used in liquid crystal cells having a variety of different, mostly optical uses, for example in display, light shutter, optical information processing or temperature sensing applications.

The smectic A liquid crystal devices can be switched between two optical states of smectic A liquid crystal, namely a light scattering state and a clear, light transmitting one. The influence of a low frequency electric field initiates a dynamic light scattering in the smectic A liquid crystals. It is necessary to have one or more ionic substances in LC mixture for the initiation of dynamic light scattering. After removal of the electric field, the dynamic structure relaxes to the static light scattering structure, accompanied by a small decrease in scattering. The application of a high frequency field to scattering structure leads to a dielectric reorientation of LC molecules and to the formation of a transparent structure.

Figure 1:
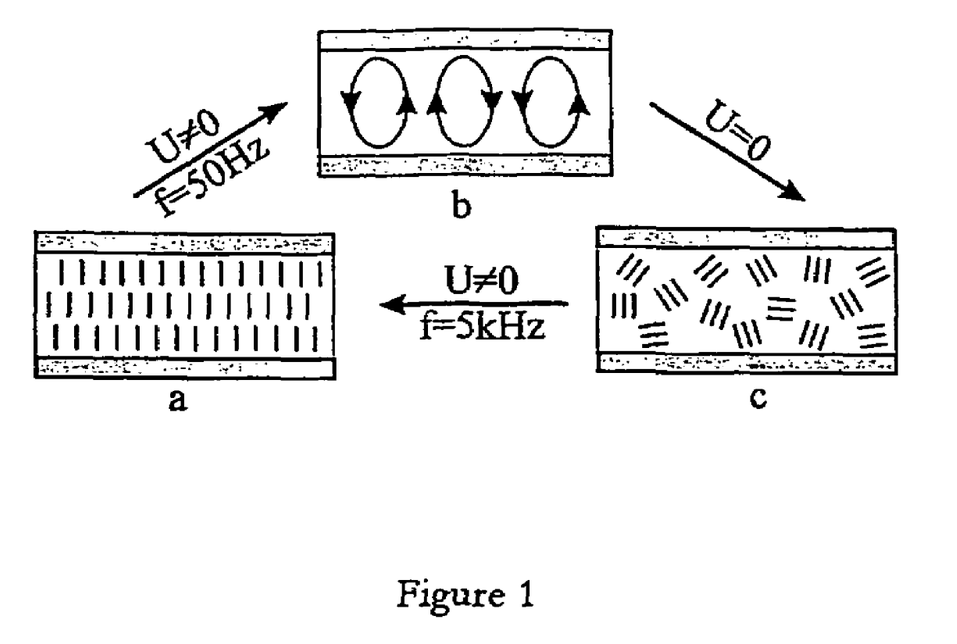

FIG. 1 shows a schematic view of the smectic A device switching. In the figure, (a) is the light transmitting structure, (b) is the dynamic light scattering structure, and (c) is the light scattering structure.

The high viscosity of smectic A liquid crystals makes these structures and intermediate ones stable for a long time without the application of an electric field. The advantages of smectic A devices based on this electrooptical effect are the memorisation of written information, hemispherical view angles, absence of polarisers, and the ability to form a grey scale.

Smectic A liquid crystals are highly viscous and therefore require a greater electric field, and thus driving voltage, applied to the electrodes of the liquid crystal cell to affect any change in orientation of molecules than for typical nematic or cholesteric liquid crystals. In order to improve the performance of known smectic A liquid crystal devices, it is desirable to improve the properties of the liquid crystals and, in particular, to reduce the driving voltage required to perform the switching and to reduce the response time required for switching to the scattering state and to the clear state. It is also desirable to improve the light scattering efficiency without deterioration of the clear state transparency, in other words, to increase the contrast between the light scattering and light transmitting areas in smectic A devices. Finally, it is also desirable to increase the lifetime of smectic A devices.

Dopants have been used in nematic devices in the past to assist alignment layering. Their use in connection with smectic A liquid crystals is only known to a limited extent. Quarternary ammonium bromides have previously been investigated (see for example U.S. Pat. No. 3,950,264, GB 2161637 and Eura Display Proc.: London, 1987, pages 96-99). However, stability in devices is often questionable and even short use often leads to discolouration, presumably due to degradation with evolution of HBr. This results in a much reduced lifetime for the device.

Therefore the effect of new and more stable ionic dopants on the electrooptical properties of a smectic A liquid crystal composition were investigated. Furthermore, the effect of ionic dopants which are chiral can lead to the induction of chiral liquid crystalline phases with useful properties. Their use is thus far unknown.

The following dopants were produced and their effect on the electrooptical properties of a smectic A liquid crystal mixture was then measured.

For the avoidance of doubt, dopants 11c and 11d are phosphonic type dopants (R—PO(OH)(O—)), whilst dopants 12b and 12f are phosphinic type dopants (R—O—PO(H)(O—)), with an oxygen atom between the C12/benzylic group and the phosphorous atom. Indeed, each of the dopants 12a-12f includes an oxygen atom between the C12/benzylic group and the sulfur or phosphorous atom.

The liquid crystal mixture used in the tests comprised 62.90% by weight K24 (4-cyano-4'-n-octylbiphenyl), 26.90% by weight K30 (4-cyano-4'-n-decylbiphenyl) and 10.20% by weight C8E (4-cyano-4'-biphenyl 4-n-octylbenzoate).

All of the liquid crystal compounds used are well known and are readily available from commercial sources such as Merck Darmstadt.

Furthermore, the terminology used above to identify the liquid crystal compounds is well established and is the most commonly used way of identifying a specific liquid crystal compound.

The measurements of the electrooptical properties of the liquid crystal mixture were performed in test cells with 15 μm cell gap. The test cells consisted of two sodium Balzers glass substrates, the inner surface of which was covered by the conductive indium-tin-oxide layer. The conductive layer had the resistivity of 30 Ohm/square and was patterned to form stripe electrodes of 225 μm width with the pitch of 250 μm. The cell gap was maintained by the spherical spacers Sekisui SP-215. The cell was assembled to obtain crossed electrodes on the opposite substrates forming the pixels in areas where the electrodes of opposite substrates crossed. The substrates were glued along the perimeter by Loctite-350 UV curing glue.

The dopants were dissolved in the liquid crystal mixture described above in equimolar quantities equal to $6.66 \cdot 10^{-3}$ mole/kg.

The electrooptical parameters were measured using the transmission measurement set-up with the automatic data acquiring consisting of a red semiconducting laser ($\lambda=650$ nm) as a light source, a silicon pin diode detector, a transimpedance amplifier for the amplification of the detector signal and a high-voltage amplifier for driving of test cell. Square wave signals were used for driving the cells. 50 Hz pulses were used for switching the cell to the light scattering state and 5 kHz pulses were used for switching the cell to the light transmitting state.

The dynamic light scattering (DLS) and dielectric reorientation (DR) response times of test cells filled with LC mixtures was measured as a time of 95% cell transmittance change when the driving voltage was applied. The cell driving consists of the successive application of high frequency and low frequency voltage cycles with 0.5 . . . 1 sec waiting time between each cycle. The low frequency cycle consisted of 20 pulses and gave DLS response time. The driving voltage was chosen as the voltage not less than one giving a full light scattering during 20 pulses of low frequency cycle. The number of high frequency voltage pulses to measure the response time of dielectric reorientation was chosen as the minimal one giving a fill transition to maximum transmittance.

The threshold voltage was chosen as one of the criteria of dopant efficiency. The threshold voltages of DLS and DR were measured as a voltage at which a 5% change of the cell transmittance occurs. Before the measurements of DLS threshold voltage, the high frequency cycle with the value of voltage used in the measurements of response time and 5 times larger number of pulses was applied to the cell in order to switch it to clear state. The DLS threshold voltage was measured by the successive application of 1 sec low frequency voltage cycles with an increase in the voltage by 1V in each cycle. Before the measurements of DR threshold voltage, the low frequency cycle with the value of voltage used in the measurements of response time and 2 times larger number of pulses was applied to the cell in order to switch it to scattering state. The DR threshold voltage was measured by the successive application of 0.5 sec high frequency voltage cycles with an increase in the voltage by 1V in each cycle.

The cell testing began with 5 ... 25 cycles of low frequency and high frequency voltage from 50V to 160V and higher if it was necessary. This was performed to stop the arcing on the low voltage and prevent the massive destruction of the cell. After this procedure, the driving voltage and number of clear pulses were chosen, measurements of response times were done and finally the threshold voltages were measured. The measurements were performed several times in several places of the cell before and after burning-in, if it was necessary. The burning-in procedure consists in driving of the cell at a quite high voltage (usually 170V rms) for 3000 ... 35000 cycles and was required for some dopants to stabilise the electrooptical parameters. For some dopants the improvement of scattering uniformity was observed.

The results of the tests are shown in Table 1.

The results on dopant 7a were not reproducible. After 3000 cycles of burning-in only one of the cells containing this dopant showed a good uniform scattering, whilst the scattering of the other three cells was not uniform. This may be due to the problem with solubility of the dopant in the LC, as it took a long time to dissolve at 90° C. The results obtained on the cell with uniform scattering are showed in the table.

The scattering provided by dopant 1a at the beginning of driving at driving voltage was not fully saturated and uniform. However, after burning-in during 3000 cycles it became good and uniform. After 35000 cycles the scattering became less uniform, DLS threshold increased from 90V to 105V, clear threshold decreased from 45V to 39V.

Dopant 5a does not require burning-in and provides good scattering. In spite of quite high scattering threshold voltage the rate of response time decreasing with the voltage increase is higher than for other dopants.

Dopant 3c requires higher driving voltage than previous ones. 3000 cycles burning-in has not helped remedy the unevenness of light scattering.

The scattering provided by dopant 3a at 200V looks uniform, but quite weak.

TABLE 1

| Dopant | Driving Voltage, V | DLS Response, msec | Clear Response, msec | DLS Threshold Voltage, V | Clear Threshold Voltage, V | Quality of Scattering |
|---|---|---|---|---|---|---|
| 1a | 150 | 183 | 5 | 90 | 45 | A |
| 1b | 250 | — | — | — | — | D |
| 1c | 250 | — | — | — | — | D |
| 1d | 150 | 94 | 5 | 78 | 55 | A |
| 1e | 150 | 120 | 5 | 80 | 54 | A |
| 2a | 150 | — | — | — | — | B |
| 2b | 250 | — | — | — | — | D |
| 3a | 200 | 70 | 1 | 109 | 39 | C |
| 3b | 250 | — | — | — | — | E |
| 3c | 170 | 175 | 2 | 97 | 44 | B |
| 4a | 200 | — | — | — | — | C |
| 5a | 150 | 73 | 4 | 97 | 45 | A |
| 6a | 150 | — | — | — | — | A |
| 7a | 150 | 155 | 5 | 86 | 49 | A |

Table 2 explains the terminology used in connection with the assessment of the quality of scattering in Table 1.

TABLE 2

| Quality of Scattering | Appearance of Scattering |
|---|---|
| A | Good uniform scattering |
| B | Moderate uneven scattering |
| C | Weak scattering |
| D | Weak uneven scattering |
| E | Very weak scattering |

The results of the investigations are explained in greater detail below.

Dopant 1d is the most efficient of the dopants and it provides a good uniform scattering. The burning-in is not required, the full scattering can be obtained at 110V using 20 pulses of 50 Hz voltage. However, it was found that the LC mixture containing this dopant is unstable, and the reasons for this are discussed below.

Dopant 1e provides a good uniform scattering and the full scattering can be obtained at 140V using 20 pulses of 50 Hz voltage. Before burning-in, the DLS threshold voltage was 90V, and after 37000 cycles the dynamic light scattering threshold voltage decreased down to 80V.

The full scattering for dopants 1c, 2b, 1b and 3b was not obtained for rms voltages up to 250V, and so no measurements were performed. The scattering of cells with the dopant 1c looks weak and not uniform. For dopants 2b and 1b the scattering is only on the perimeter of the pixels and it difficult to see the switching of cell with dopant 3b. It was difficult to dissolve these dopants in LC at 90° C.

As can be seen from the results in Table 1 and discussed above, dopants 1d and 1e were found to produce the best scattering results at the lowest driving voltage and have the lowest DLS threshold voltage. Furthermore, the lowest DLS threshold voltage was obtained using dopant 1d. However, dopant 1d was found to be unstable during cell switching. Gas bubbles were observed after several thousands of cycles. The speed of degradation depended on the driving voltage applied. The gas is believed to be produced as a result of electrolytic Kolbe oxidation, as illustrated below:

No gas bubbles were observed while driving the liquid crystal mixtures containing the other dopants that were tested.

This instability of dopant 1d suggests that carboxylic dopants are unsuitable for use in liquid crystal devices if the electrodes of the cell are not isolated from contact with the LC material. The introduction of isolation layers complicates the cell production and negatively influences the electrooptical parameters, particularly the threshold voltage of dynamic light scattering. A critical voltage for decomposition of carboxylic dopants may also exist. However, sulfonic (1e) and phosphonic (7a) dopants, and especially those closely related to dopant 1d, appear to exhibit the highly desirable properties of dopant 1d, without the unacceptable instability.

Thus, in accordance with the first aspect of the present invention, there is provided an ionic dopant comprising a sulfur or a phosphorus containing anion with a random cation, for use in a smectic A liquid crystal composition, wherein the ionic dopant is capable of reducing the driving voltage of the smectic A liquid crystal device and enhancing dynamic light scattering. Naturally, threshold voltage is not only the parameter of LC, but also LC+cell (cell gap, surface roughness, etc.).

In a preferred embodiment of the first aspect of the invention, the sulfur or phosphorus containing anion comprises X, wherein X is one of the following: $S^-$, $SO_2^-$, $SO_3^-$, $SO_4^-$, $NHSO_3^-$, $POH^-$, $PO_2H^-$, $PO_3H^-$, $(PO_3)_2^-$, $PO_4H^-$ or $(PO_4)_2^-$.

In another preferred embodiment, the dopant comprises an anion according to formula I:

$$X\text{—}O_m(CH_2)_n\text{—}R \qquad \text{I}$$

wherein X is $S^-$, $SO_2^-$, $SO_3^-$, $NHSO_3^-$, $POH^-$, $PO_2H^-$, $PO_3H^-$ or $(PO_3)^{2-}$; m is 0 or 1; n is 0 to 19; and R is $R^3$, $R^1R^3$, $R^1\text{—}(CO_2)\text{—}R^3$, $R^1\text{—}(CO_2)\text{—}R^2R^3$, $R^1\text{—}(CH_2)_p\text{—}R^3$, or $R^1\text{—}(CH_2)_p\text{—}R^2R^3$, wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, an alkyl chain wherein one or more non-adjacent $CH_2$-groups are replaced by an oxygen atom; and p is 0 to 19.

Whilst some of the anions encompassed by formula I may be known, they are not known for use as dopants for smectic A liquid crystal mixtures. The beneficial properties these dopants afford to smectic A liquid crystal mixtures has certainly not previously been recognised.

Examples of some of the preferred anions are as follows:

wherein X is $SO_3^-$, $(PO_3H)^-$, $PO_3^{2-}$, and $R^3$ is an alkyl or alkoxy chain.

According to a second aspect of the present invention, there is provided an ionic dopant comprising a quaternary ammonium cation and an anion, for use in a smectic A liquid crystal composition, wherein the ionic dopant is capable of reducing the driving voltage of the smectic A liquid crystal device and enhancing dynamic light scattering. Such a cation may also be used in the dopant according to the first aspect of the invention.

In a preferred embodiment, the cation is based on a heterocyclic base, such as an N-alkylpyridine, an N-N'-dialkylimidazole, an N-N'-dialkylbenzimidazole, an N-N'-dialkyltriazole, an N-alkylquinuclidine or an N-alkylazanaphthalene. Preferably, the cation is according to formula II:

$$Y\text{—}(CH_2)_q\text{—}R \qquad \text{II}$$

wherein Y is $NR^4R^5R^6$ wherein $R^4$, $R^5$ and $R^6$ is in every instance an alkyl group or an alkyl chain containing 0 to 5 carbon atoms, pyridines, N-alkylimidazoles, N-alkylbenzimidazoles, N-alkyltriazoles, alkylquinuclidines or alkylazanaphthalenes, q is 0 to 19; and R is $R^3$, $R^1R^3$, $R^1\text{—}(CO_2)\text{—}R^3$, $R^1\text{—}(CO_2)\text{—}R^2R^3$, $R^1\text{—}(CH_2)_p\text{—}R^3$, or $R^1\text{—}(CH_2)_p\text{—}R^2R^3$, wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, an alkyl chain wherein one or more non-adjacent $CH_2$-groups are replaced by an oxygen atom; and p is 0 to 19.

For example, the cation may be n-hexadecyltrimethylammonium (HTMA) or n-hexadecyldimethylethylammonium (HDME). These and other examples of cations are illustrated below.

where $R^7$, $R^8$, $R^9$ and $R^{10}$ are alkyl chains.

In a preferred embodiment, the anion or cation contains groups giving rise to chirality, via either a chiral centre or atropisomers, as illustrated below:

where n = 0-7

Y = O, $CO_2$
where n = 0-7

-continued where n = 0-5

According to a third embodiment of the present invention, a smectic A liquid crystal composition is provided, comprising one or more ionic dopants according to the first and second aspects of the present invention.

The dopants according to the invention may be used in connection with a wide variety of known smectic A liquid crystal compositions. In particular, the liquid crystal compositions used may be those disclosed in International Publication No. WO 86/04324 (Merck Patent GmbH), to which one or more dopants is added.

According to a fourth aspect of the present invention, a liquid crystal device is provided, containing a smectic A liquid crystal composition according to the third aspect of the invention. In a preferred embodiment, the device is a display or a light shutter.

According to a fifth aspect of the present invention, a method of doping a smectic A liquid crystal composition is provided, wherein one or more dopants according to the first and second aspects of the invention are added to a smectic A liquid crystal composition.

The synthesis of some of the dopants discussed herein is now described. The synthesis of the dopants is generally straightforward for a person skilled in the art.

Dopant 1a—Hexadecyl-trimethylammonium bromide

The compound was purchased from Sigma-Aldrich (CAS reg. no. 57-09-0).

Dopant 1b—Hexadecyl-trimethylammonium hexafluorophosphate

To a 0.15M solution of hexadecyl-trimethylammonium bromide (dopant 1a) (13.7 mmol; 1.0 equivalent) in ethanol was added an aqueous solution of 65% hexafluorophosphoric acid (5 ml; 2.9 equivalent acid) to afford a white precipitate. The solid was dissolved in warm ethanol and treated with the 65% aqueous hexafluorophosphoric acid (3 ml). Addition of water (ca. 200 ml) and cooling to 0° C. produced a white solid which was recrystallised from ethanol to yield the pure product as white crystals (4.72 g; 80%); mp 203-206° C. $^1$H NMR (300 MHz, $CDCl_3/CD_2Cl_2$) δ 0.85 (3H, t, J 6.6 Hz, $CH_3$), 1.23-1.33 (26H, m), 1.68 (2H, m), 3.13 (9H, s, 3×$NCH_3$), 3.26 (2H, m, $NCH_2R$). $^{13}$C NMR (75 MHz, $CDCl_3/CD_2Cl_2$) δ 13.82, 22.48, 22.93, 25.83, 28.85, 29.09, 29.14, 29.23, 29.36, 29.41, 29.42, 29.48 (broad), 31.71, 67.35. $^{31}$P NMR (121 MHz, $CDCl_3/CD_2Cl_2$) δ −144.25 (1P, septet: J 7.11 Hz).

Dopant 1c—Hexadecyl-trimethylammonium tetrafluoroborate

The compound was purchased from Fluka (CAS reg. no. 73257-08-6).

Dopant 1d—Hexadecyl-trimethylammonium nonyloxybenzoate p-Nonyloxybenzoacid (1.59 g, 6.30 mmol) and potassium hydroxide (0.6 g, 10.6 mmol) were dissolved in water (150 ml) until a clear solution had formed. Hexadecyl-trimethylammonium bromide (dopant 1a) (3.60 g, 10.0 mmol) was dissolved in water (150 ml) under heating. The two solutions were combined and stirred before placing in a refrigerator. White crystals were formed, filtered and dried under reduced pressure. $^1$H NMR (300 MHz, $CDCl_3$) δ 0.90 (6H, m, 2×$CH_3$), 1.26-1.40 (38H, m), 1.78 (4H, m), 3.11 (9H, s, 3×$NCH_3$), 3.31 (2H, m, $NCH_2R$), 3.99 (2H, t, J 6.4 Hz, $OCH_2R$), 6.85 (2H, m, ArH), 7.88 (2H, m, ArH). $^{13}$C NMR (75 MHz, $CD_2Cl_2$) δ 14.36, 23.24, 23.54, 26.56, 26.67, 29.67, 29.81, 29.83, 29.92 (broad), 29.97, 30.04, 30.11, 30.17, 30.22 (broad), 30.25 (broad), 32.45, 32.48, 67.66, 68.61, 113.82, 131.46, 161.46, 173.75.

Dopant 1e—Hexadecyl-trimethylammonium dodecylbenzenesulphonide

Hexadecyl-trimethyl-ammonium bromide (dopant 1a) (0.895 g, 2.46 mmol) was dissolved in iso-propanol (50 ml) and silver oxide ($Ag_2O$; 0.285 g, 1.23 mmol) was added to afford a suspension of silver bromide (solid) and hexadecyl-trimethylammonium hydroxide (in solution). Filtration through a small celite column yielded the pure hexadecyl-trimethylammonium hydroxide solution. The solution of hexadecyl-trimethylammonium hydroxide was carefully added to a 0.09M solution of p-dodecylbenzosulphonic acid (2.2 mmol) in isopropanol (25 ml) at 0° C., until the pH reached 4-5. The solvent was then removed under reduced pressure to afford a viscous colourless liquid. This liquid was dissolved in pentane, filtered and recrystallised from pentane at −45° C. to afford the pure product, dopant 1e (0.267 g, 20%). $^1$H NMR (300 MHz, $CD_2Cl_2$) δ 0.88 (6H, m, 2×$CH_3$), 1.21-1.34 (46H, m), 1.51-1.69 (4H, m), 3.23 (9H, s, 3×$NCH_3$), 3.34 (2H, m, $NCH_2R$), 7.13-7.20 (2H, m, ArH), 7.69-7.71 (2H, m, ArH).

Dopant 2a—Hexadecyl-dimethyl-ethylammonium bromide

The compound was purchased from Sigma-Aldrich (CAS reg. no. 124-03-8).

Dopant 2b—Hexadecyl-dimethyl-ethylammonium hexafluorophosphate

To a 0.15M solution of hexadecyl-dimethyl-ethylammonium bromide (dopant 2a) (13.2 mmol; 1.0 equivalent)-in ethanol was added an aqueous solution of 65% hexafluorophosphoric acid (5 ml; 3.0 equivalent acid) to afford a white precipitate. The solid was collected by vacuum filtration and dissolved in warm ethanol and treated with the 65% aqueous hexafluorophosphoric acid (3 ml). Addition of water (ca. 200 ml) and cooling to 0° C. produced a white solid which was recrystallised from ethanol to yield the pure product as white crystals (4.67 g; 80%); mp 150-153° C. $^1$H NMR (300 MHz, CDCl$_3$) δ 0.86 (3H, t, J 6.6 Hz, CH$_3$), 1.24-1.36 (29H, m), 1.66 (2H, m), 2.99 (6H, s, 2×NCH$_3$), 3.16 (2H, m, NCH$_2$R), 3.32 (2H, q, J 7.1 Hz, NCH$_2$). $^{13}$C NMR (75 MHz, CDCl$_3$) δ 7.85, 13.98, 22.36, 22.56, 26.01, 28.97, 29.24, 29.29, 29.40, 29.52, 29.55, 29.57, 29.60 (broad), 31.80, 50.05 (broad), 59.44, 63.67. $^{31}$P NMR (121 MHz, CDCl$_3$) δ −144.25 (1P, septet: J 713 Hz).

Dopant 3a—N-Hexadecylpyridinium bromide

A mixture of pyridine (2.85 g, 36.0 mmol) and 1-bromohexadecane (10.0 g, 32.7 mmol) were heated at reflux for 2 days to yield a yellow solution. On cooling to room temperature a pale brown solid formed which was recrystallised from a mixture of ethylacetate/acetonitrile (1:1) to afford a cream solid. This material was washed with diethyl ether to yield the pure product as a white solid (12.3 g, 98%). $^1$H NMR (300 MHz, CDCl$_3$) δ 0.80 (3H, t, J 6.7 Hz, CH$_3$), 1.16-1.27 (26H, m), 1.95-2.00 (2H, m), 4.90 (2H, t, J 7.6 Hz, NCH$_2$), 8.13 (2H, t, J 7.0 Hz, ArH), 8.50 (1H, t, J 7.8 Hz, ArH), 9.41 (2H, d, J 5.5 Hz, ArH). $^{13}$C NMR (75 MHz, CDCl$_3$) δ 13.85, 22.41, 25.82, 28.84, 29.08, 29.12, 29.27, 29.35, 29.38 (broad), 29.40, 29.42 (broad), 31.64, 31.72, 61.87, 128.31, 144.84, 145.04.

Dopant 3b—N-Hexadecylpyridinium hexafluorophosphate

To a 0.15M solution of hexadecylpyridinium bromide (dopant 3a) (2.60 mmol; 1.0 equivalent) in ethanol was added an aqueous solution of 65% hexafluorophosphoric acid (1 ml; 3.0 equivalent acid) to afford a white precipitate. The solid was collected by vacuum filtration and dissolved in warm ethanol and treated with the 65% aqueous hexafluorophosphoric acid (0.6 ml). Addition of water (ca. 40 ml) and cooling to 0° C. produced a white solid which was recrystallised from ethanol to yield the pure product as white crystals (0.877 g; 75%). $^1$H NMR (300 MHz, CD$_2$Cl$_2$) δ 0.89 (3H, t, J 6.7 Hz, CH$_3$), 1.20-1.36 (26H, m), 1.99-2.04 (2H, m), 4.57 (2H, t, J 7.6 Hz, NCH$_2$), 8.09 (2H, t, J 7.2 Hz, ArH), 8.52 (1H, t, J 7.8 Hz, ArH), 8.68 (2H, d, J 5.5 Hz, ArH). $^{13}$C NMR (75 MHz, CD$_2$Cl$_2$) δ 14.43, 23.24, 26.55, 29.46, 29.87, 29.91, 30.05, 30.16, 30.22 (broad), 30.26 (broad), 31.98, 32.48, 63.31, 129.29, 144.58, 146.30. $^{31}$P NMR (121 MHz, CD$_2$Cl$_2$) δ −144.44 (1P, septet: J 711 Hz).

Dopant 3c—N-Hexadecylpyridinium dodecylbenzenesulphonide

To a solution of hexadecylpyridinium bromide (3a) (2 mmol) dissolved in iso-propanol (50 ml) was added the p-dodecylbenzosulphonic silver salt (2 mmol). The reaction mixture was stirred before the solvent was removed under reduced pressure to yield the pure product as grey/white oil (0.5 g, 40%).

Dopant 4a—N-Decylpyridinium bromide

A mixture of pyridine (30.93 g, 49.7 mmol) and 1-bromodecane (10.0 g, 45.2 mmol) were heated at reflux for 2 days to yield a yellow solution. On cooling to room temperature a pale brown solid formed which was recrystallised from a (1:1) mixture of ethyl acetate/acetonitrile to afford a cream solid. This material was washed with diethyl ether to yield the pure product as a white solid (11.4 g, 84%). $^1$H NMR (300 MHz, CDCl$_3$) δ 0.74 (3H, t, J 6.7 Hz, CH$_3$), 1.10-1.27 (14H, m), 1.90-2.00 (2H, m), 4.89 (2H, t, J 7.4 Hz, NCH$_2$), 8.09 (2H, t, J 7.1 Hz, ArH), 8.46 (1H, t, J 7.8 Hz, ArH), 9.52 (2H, d, J 5.5 Hz, ArH). $^{13}$C NMR (75 MHz, CDCl$_3$) δ 13.64, 22.16, 25.59, 28.60, 28.74, 28.88, 28.97, 31.33, 31.62, 61.54, 128.12, 144.78, 144.97.

Dopant 5a—1-Hexadecyl-3-methylimidazolium bromide

Freshly dried 1-methylimidazole (10.2 g, 125 mmol) and 1-bromohexadecane (65.7 g, 215 mmol) were added to dry toluene (13 ml) under argon. The mixture was then heated at reflux for 24 hours, to form a two layer system after cooling to room temperature. Further cooling at −10° C. overnight afforded a white solid. This material was isolated by decanting off the excess toluene under argon. The crude product was purified by recrystallisation from a minimum amount of dry acetonitrile/diethyl ether (3:1) to obtain a beige solid (43.0 g, 89%). $^1$H NMR (300 MHz, CDCl$_3$) δ 0.81 (3H, t, J 6.6 Hz, CH$_3$), 1.19-1.25 (26H, m), 1.83-1.88 (2H, m), 4.08 (3H, s, NCH$_3$), 4.26 (2H, t, J 7.3 Hz, NCH$_2$), 7.41 (1H, s, ArH), 7.60 (1H, s, ArH), 10.3 (1H, s, ArH). $^{13}$C NMR (75 MHz, CDCl$_3$) δ 13.91, 22.47, 26.06, 28.81, 29.14, 29.18, 29.31, 29.40, 29.43, 29.44 (broad), 29.48 (broad), 30.14, 31.70, 36.57, 49.96, 121.62, 123.42, 137.04.

Dopant 6a—1-Decyl-3-methylimidazolium bromide

Freshly dried 1-methylimidazole (10.3 g, 125 mmol) and 1-bromodecane (47.5 g, 215 mmol) were added to dry toluene (13 ml) under argon. The mixture was then heated at reflux for 24 hours, to form a two layer system after cooling to room temperature. Further cooling at −10° C. overnight afforded a white solid. This material was isolated by decanting off the excess toluene under argon. The crude product was purified by recrystallisation from a minimum amount of dry acetonitrile/diethyl ether (3:1) to obtain a beige solid (60.57 g, 17.3%). $^1$H NMR (300 MHz, CDCl$_3$) δ 0.72 (3H, t, J 6.7 Hz, CH$_3$), 1.09-1.18 (14H, m), 1.75-1.79 (2H, m), 3.99 (3H, s, NCH$_3$), 4.18 (2H, t, J 7.4 Hz, NCH$_2$), 7.41 (1H, t, J 7.1 Hz, ArH), 7.61 (1H, t, J 7.8 Hz, ArH), 10.2 (1H, d, J 5.5 Hz, ArH). $^{13}$C NMR (75 MHz, CDCl$_3$) δ 13.61, 22.14, 25.76, 28.50, 28.73, 28.86, 28.94, 29.87, 31.32, 36.23, 49.62, 121.70, 123.47, 136.68.

Dopant 7a—Hexadecyl-trimethylammonium nonyloxybenzenephosphonide

To a solution of hexadecyl-trimethyl-ammonium bromide (1a) (0.361 g, 0.99 mmol) in iso-propanol (50 ml) was added the nonyloxybenzene phosphonic silver salt (0.49 g, 0.99 mmol; 1.0 equivalent). The reaction mixture was stirred before the solvent was removed under reduced pressure to yield the pure product as a white solid (0.12 g, 21%). $^1$H NMR (300 MHz, CDCl$_3$) δ 0.83-0.88 (6H, m, 2×CH$_3$), 1.23-1.42 (38H, m), 1.70-1.77 (4H, m), 3.40 (9H, s, 3×NCH$_3$), 3.47-3.53 (2H, m), 3.92 (2H, t, J 6.6 Hz), 6.83-6.85 (2H, m, ArH), 7.25-7.69 (2H, m, ArH). $^{31}$P NMR (121 MHz, CDCl$_3$) δ 19.28 (1P, s).

The invention claimed is:

1. A method to reduce the driving voltage of a device comprising a smectic A liquid crystal composition and to enhance dynamic light scattering of the composition, said method comprising doping a smectic A liquid crystal composition with an ionic dopant comprising a sulfur or a phosphorous containing anion with a cation.

2. A device comprising a smectic A liquid crystal composition, wherein the smectic A liquid crystal composition comprises one or more ionic dopants, wherein the ionic dopant comprises a sulfur or a phosphorus containing anion with a cation, wherein the ionic dopant reduces the driving voltage of the device and enhances dynamic light scattering of the composition.

3. The device as claimed in claim 2, wherein the device is a display or a light shutter.

4. A method of doping a smectic A liquid crystal composition, comprising adding an ionic dopant to a smectic A liquid crystal composition, wherein the ionic dopant comprises a sulfur or a phosphorus containing anion with a cation, wherein the ionic dopant reduces the driving voltage of a device comprising the smectic A liquid crystal composition and enhances dynamic light scattering of the composition.

5. A smectic A liquid crystal composition, comprising one or more ionic dopants, wherein the ionic dopant comprises a phosphorus containing anion with a cation, wherein the ionic dopant reduces the driving voltage of a device comprising the smectic A liquid crystal composition and enhances dynamic light scattering of the composition.

6. The composition as claimed in claim 5, wherein the anion comprises X, and X is one of the following: $POH^-$, $PO_2H^-$, $PO_3H^-$, $(PO_3)^{2-}$, $PO_4H^-$ or $(PO_4)^{2-}$.

7. The composition as claimed in claim 5, wherein the anion is according to formula I:

$$X\text{—}O_m(CH_2)_n\text{—}R \qquad \text{I}$$

wherein X is $POH^-$, $PO_2H^-$, $PO_3H^-$ or $(PO_3)^{2-}$; m is 0 or 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19.

8. The composition as claimed in claim 5, wherein the anion comprises:

wherein X is $PO_3H^-$ or $(PO_3)^{2-}$, and $R^3$ is an alkyl or alkoxy chain.

9. The composition as claimed in claim 5, wherein the anion is chiral.

10. The composition as claimed in claim 5, wherein the dopant is:

-continued

11. The composition as claimed in claim 5, wherein the cation is a quaternary ammonium cation.

12. A smectic A liquid crystal composition, comprising one or more ionic dopants, wherein the ionic dopant comprises a sulfur containing anion with a cation, wherein the ionic dopant reduces the driving voltage of a device comprising the smectic A liquid crystal composition and enhances dynamic light scattering of the composition, wherein:

(a) the anion comprises X, and X is one of the following: $S^-$, $SO_2^-$, $SO_4^-$ or $NHSO_3^-$; or

(b) the anion is according to formula I:

$$X\text{—}O_m(CH_2)_n\text{—}R \qquad \text{I}$$

wherein X is $S^-$, $SO_2^-$ or $NHSO_3^-$; m is 0 or 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaplithalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (c) the anion is according to formula I:

X—$O_m(CH_2)_n$—R    I wherein X is $S^-$, $SO_2^-$, $SO_3^-$ or $NHSO_3^-$; m is 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (d) the anion is according to formula I:

X—$O_m(CH_2)_n$—R    I wherein X is $S^-$, $SO_2^-$, $SO_3^-$ or $NHSO_3^-$; m is 0 or 1; n is 0 to 19; and R is $R^3$, $R^1$—$(CO_2)$—$R^3$, $R^1$—$(CO_2)$—$R^2R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (e) the anion is according to formula I:

X—$O_m(CH_2)_n$—R    I wherein X is $S^-$, $SO_2^-$, $SO_3^-$ or $NHSO_3^-$; m is 0 or 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a biphenyl, a substituted biphenyl, a terphenyl, a substituted terphenyl, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (f) the anion is according to formula I:

X—$O_m(CH_2)_n$—R    I wherein X is $S^-$, $SO_2^-$, $SO_3^-$ or $NHSO_3^-$; m is 0 or 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl substituted cyclohexyl, an alkenyl chain, or an alkyl chain wherein one or more non-adjacent $CH_2$-groups are replaced by an oxygen atom; and p is 0 to 19; or (g) the anion comprises:

wherein X is $SO_3^-$, and $R^3$ is an alkoxy chain; or (h) the anion is chiral; or (i) the cation is based on an N,N'-dialkylimidazole, an N,N'-dialkylbenzimidazole, an N,N'-dialkyltriazole, an N-alkylquinuclidine or an N-alkylazanaphthalene; or (j) the cation is according to formula II:

Y—$(CH_2)_q$—R    II wherein Y is $NR^4R^5R^6$ wherein $R^4$, $R^5$ and $R^6$ is in every instance an alkyl group or an alkyl chain containing 0 to 5 carbon atoms, N-alkylimidazoles, N-alkylbenzimidazoles, N-alkyltriazoles, alkyiquinuclidines or alkylazanaphthalenes; q is 0 to 19; and R is $R^3$, $R^1R^3$, $R^1$—$(CO_2)$—$R^3$, $R^1$—$(CO_2)$—$R^2R^3$, $R^1$—$(CH_2)_{p—R3}$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (k) the cation is according to formula II:

$$Y—(CH_2)_q—R \qquad II$$

wherein Y is $NR^4R^5R^6$ wherein $R^4$, $R^5$ and $R^6$ is in every instance an alkyl group or an alkyl chain containing 0 to 5 carbon atoms, pyridines, N-alkylimidazoles, N-alkylbenzimidazoles, N-alkyltriazoles, alkyiquinuclidines or alkylazanaphthalenes; q is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a cyano group, an alkyl substituted cyclohexyl, an alkenyl chain, or an alkyl chain wherein one or more non-adjacent $CH_2$-groups are replaced by an oxygen atom; and p is 0 to 19; or (l) the cation is:

where $R^7$, $R^8$, $R^9$ and $R^{10}$ are alkyl chains; or

(m) the cation is n-hexadecyltrimethylammonium (HTMA) or n-hexadecyldimethylethyl-ammonium (HDME); or (n) the cation is chiral; or (o) the dopant is:

13. The composition as claimed in claim 12, wherein the cation is a quaternary ammonium cation.

14. A method to reduce the driving voltage of a device comprising a smectic A liquid crystal composition and to enhance dynamic light scattering of the composition, said method comprising doping a smectic A liquid crystal composition with an ionic dopant comprising a quaternary ammonium cation with an anion.

15. A device comprising a smectic A liquid crystal composition, wherein the smectic A liquid crystal composition comprises one or more ionic dopants, wherein the ionic dopant comprises a quaternary ammonium cation with an anion, wherein the ionic dopant reduces the driving voltage of the device and enhances dynamic light scattering of the composition.

16. The device as claimed in claim 15, wherein the device is a display or a light shutter.

17. A method of doping a smectic A liquid crystal composition, comprising adding an ionic dopant to a smectic A liquid crystal composition, wherein the ionic dopant comprises a quaternary ammonium cation with an anion, wherein the ionic dopant reduces the driving voltage of a device comprising the smectic A liquid crystal composition and enhances dynamic light scattering of the composition.

18. A smectic A liquid crystal composition, comprising one or more ionic dopants, wherein the ionic dopant comprises a quaternary ammonium cation with an anion, wherein the ionic dopant reduces the driving voltage of a device comprising the smectic A liquid crystal composition and enhances dynamic light scattering of the composition, wherein:

(a) the anion is a phosphorus containing anion; or (b) the anion comprises X, and X is one of the following: $S^-$, $SO_2^-$, $SO_4^-$, $NHSO_3$, $POH^-$, $PO_2H^-$, $PO_3H^-$, $(PO_3)^{2-}$, $PO_4H^-$ or $(PO_4)$; or

(c) the anion is according to formula I:

$$X—O_m(CH_2)_n—R \qquad I$$

wherein X is $S^-$, $SO_2^-$, $NHSO_3^-$, $POH^-$, $PO_2H^-$, $PO_3H^-$ or $(PO_3)^{2-}$; m is 0 or 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (d) the anion is according to formula I:

X—$O_m(CH_2)_n$—R  I wherein X is $S^-$, $SO_2^-$, $SO_3^-$, $NHSO_3^-$, $POH^-$, $PO_2H^-$, $PO_3H^-$ or $(PO_3)^{2-}$; m is 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (e) the anion is according to formula I:

X—$O_m(CH_2)_n$—R  I wherein X is $S^-$, $SO_2^-$, $SO_3^-$, $NHSO_3^-$, $POH^-$, $PO_2H^-$, $PO_3H^-$ or $(PO_3)^{2-}$; m is 0 or 1; n is 0 to 19; and R is $R^3$, $R^1$—$(CO_2)$—$R^3$, $R^1$—$(CO_2)$—$R^2R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (f) the anion is according to formula I:

X—$O_m(CH_2)_n$—R  I wherein X is $S^-$, $SO_2^-$, $SO_3^-$, $NHSO_3^-$, $POH^-$, $PO_2H^-$, $PO_3H^-$ or $(PO_3)^{2-}$; m is 0 or 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a biphenyl, a substituted biphenyl, a terphenyl, a substituted terphenyl, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (g) the anion is according to formula I:

X—$O_m(CH_2)_n$—R  I wherein X is $S^-$, $SO_2^-$, $SO_3^-$, $NHSO_3^-$, $POH^-$, $PO_2H^-$, $PO_3H^-$ or $(PO_3)^{2-}$; m is 0 or 1; n is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl substituted cyclohexyl, an alkenyl chain, or an alkyl chain wherein one or more non-adjacent $CH_2$-groups are replaced by an oxygen atom; and p is 0 to 19; or (h) the anion comprises:

wherein X is $SO_3^-$, $PO_3H^-$ or $(PO_3)^{2-}$, and $R^3$ is an alkoxy chain; or (i) the anion is chiral; or (j) the cation is based on an N,N'-dialkylimidazole, an N,N'-dialkylbenzimidazole, an N,N'-dialkyltriazole, an N-alkylquinuclidine or an N-alkylazanaphthalene; or (k) the cation is according to formula II:

Y—$(CH_2)_q$—R  II wherein Y is $NR^4R^5R^6$ wherein $R^4$, $R^5$ and $R^6$ is in every instance an alkyl group or an alkyl chain containing 0 to 5 carbon atoms, N-alkylimidazoles, N-alkylbenzimidazoles, N-alkyltriazoles, alkyiquinuclidines or alkylazanaphthalenes; q is 0 to 19; and R is $R^3$, $R^1R^3$, $R^1$—$(CO_2)$—$R^3$, $R^1$—$(CO_2)$—$R^2R^3$, $R^1$—$(CH_2)_p$—$R^3$, or $R^1$—$(CH_2)_p$—$R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a hydrogen, a cyano group, an alkyl chain, an alkyl substituted cyclohexyl, an alkenyl chain, or an alkyl chain wherein one or more non-adjacent $CH_2$-groups are replaced by an oxygen atom; and p is 0 to 19; or (l) the cation is according to formula II:

$$Y-(CH_2)_q-R \qquad \text{II}$$

wherein Y is $NR^4R^5R^6$ wherein $R^4$, $R^5$ and $R^6$ is in every instance an alkyl group or an alkyl chain containing 0 to 5 carbon atoms, pyridines, N-alkylimidazoles, N-alkylbenzimidazoles, N-alkyltriazoles, alkyiquinuclidines or alkylazanaphthalenes; q is 0 to 19; and R is $R^3$, $R^1R^3$, $R^1-(CO_2)-R^3$, $R^1-(CO_2)-R^2R^3$, $R^1-(CH_2)_p-R^3$, or $R^1-(CH_2)_p-R^2R^3$; wherein $R^1$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^2$ is a phenyl, a substituted phenyl, a biphenyl, a substituted biphenyl, a terphenyl, a substituted terphenyl, an aromatic ring, a non-aromatic ring, a cyclohexyl, a cyclopentyl, a diazine, a bidiazine, a terdiazine, a phenyldiazine, a biphenyldiazine, a naphthalene or an azanaphthalene; $R^3$ is a cyano group, an alkyl substituted cyclohexyl, an alkenyl chain, or an alkyl chain wherein one or more non-adjacent $CH_2$-groups are replaced by an oxygen atom; and p is 0 to 19; or (m) the cation is:

or where $R^7$, $R^8$, $R^9$ and $R^{10}$ are alkyl chains; or

(n) the cation is n-hexadecyltrimethylammonium (HTMA) or n-hexadecyldimethylethyl-ammonium (HDME); or
(o) the cation is chiral; or
(p) the dopant is:

1a
1b
1c
1d
1e
2a
2b
3a

3b

3c

4a

5a

6a

7a

8a

9a

9b

9c

10a

10b

11a

11b

11c

11d

-continued

19. The composition as claimed in claim 18, wherein the anion is a sulfur or a phosphorus containing anion.

* * * * *